(12) United States Patent
Furusho et al.

(10) Patent No.: US 9,518,374 B2
(45) Date of Patent: Dec. 13, 2016

(54) SHOVEL AND SWIVELING SPEED REDUCER

(71) Applicant: Sumitomo Heavy Industries, Ltd., Tokyo (JP)

(72) Inventors: Kentaro Furusho, Kanagawa (JP); Kazunori Hiranuma, Kanagawa (JP); Takeshi Okada, Kanagawa (JP); Yoshitaka Shizu, Aichi (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/617,483

(22) Filed: Feb. 9, 2015

(65) Prior Publication Data

US 2015/0233091 A1 Aug. 20, 2015

(30) Foreign Application Priority Data

Feb. 14, 2014 (JP) .................................. 2014-026964

(51) Int. Cl.
*E02F 9/12* (2006.01)
*E02F 9/20* (2006.01)
*F16H 57/04* (2010.01)

(52) U.S. Cl.
CPC .............. *E02F 9/126* (2013.01); *E02F 9/202* (2013.01); *E02F 9/2095* (2013.01); *F16H 57/0421* (2013.01); *F16H 57/0447* (2013.01)

(58) Field of Classification Search
CPC ....................................................... E02F 9/126
See application file for complete search history.

(56) References Cited

U.S. PATENT DOCUMENTS

| 2008/0045369 A1* | 2/2008 | Tamenaga | F16H 57/0495 475/160 |
| 2012/0238390 A1* | 9/2012 | Ishizuka | F16H 57/027 475/159 |
| 2013/0089400 A1* | 4/2013 | Uzawa | E02F 9/123 414/744.1 |

FOREIGN PATENT DOCUMENTS

| EP | 1429068 | * 11/2003 |
| JP | 2013-213513 A | 10/2013 |

* cited by examiner

*Primary Examiner* — Mark Manley
(74) *Attorney, Agent, or Firm* — Fenwick & West LLP

(57) ABSTRACT

Provided is a shovel including a swiveling motor, and a swiveling speed reducer that reduces the rotational speed of an output shaft of the swiveling motor. The swiveling speed reducer includes a first gear mechanism; a first gear case that houses the first gear mechanism; a first oil check pipe that is disposed in the first gear case; a first communication portion that allows an inside of the first gear case and the first oil check pipe to communicate with each other; and a second communication portion that connects a position of the first gear case higher than a position where the first communication portion is connected, and a high position of the first oil check pipe.

8 Claims, 8 Drawing Sheets

SHOVEL AND SWIVELING SPEED REDUCER

RELATED APPLICATIONS

Priority is claimed to Japanese Patent Application No. 2014-026964, filed Feb. 14, 2014, the entire content of which is incorporated herein by reference.

BACKGROUND

Technical Field

Certain embodiments of the invention relate to a shovel and a swiveling speed reducer.

SUMMARY

In the related art, swiveling drive devices having a drive motor for swiveling, and a speed reducer configured by attaching a gear mechanism to a driving shaft of this drive motor are known.

Additionally, lubricating oil, which reduces the friction between gears constituting the gear mechanism, is enabled to be supplied to the inside of this type of speed reducer. Also, there are also known swiveling drive devices having a configuration in which an oil check pipe is provided in order to perform oil checking of this lubricating oil.

Also, since the temperature of the lubricating oil inside the speed reducer rises by rotating the drive motor for swiveling, volume expansion is caused, and the pressure of an air chamber that is an upper region within a speed reducer chamber rises.

According to an embodiment of the present invention, there is provided a shovel including a swiveling motor, and a swiveling speed reducer that reduces the rotational speed of an output shaft of the swiveling motor. The swiveling speed reducer includes a first gear mechanism; a first gear case that houses the first gear mechanism; a first oil check pipe that is disposed in the first gear case; a first communication portion that allows an inside of the first gear case and the first oil check pipe to communicate with each other; and a second communication portion that connects a position of the first gear case higher than a position where the first communication portion is connected, and a high position of the first oil check pipe.

DETAILED DESCRIPTION

Figure 1:
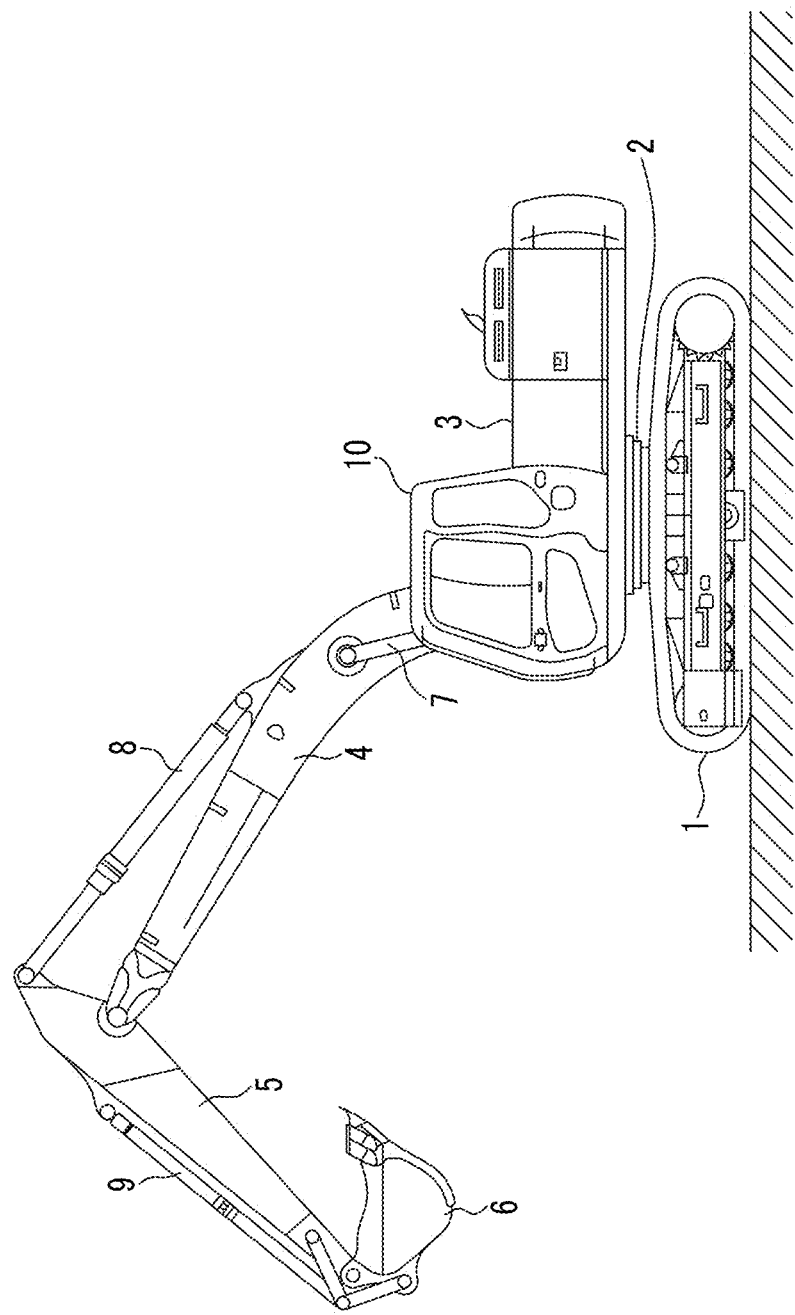
FIG. 1 is a side view of a construction machine related to the present embodiment.

An operator of a shovel may perform oil checking immediately after the end of operation of a swiveling drive device. However, even if the drive motor for swiveling is rested, the temperature inside the motor does not fall immediately. Therefore, a state where pressure is high due to the influence of heat is maintained for a while. An oil surface within the speed reducer chamber is pushed down due to the pressure of the air chamber within the speed reducer chamber being raised, the lubricating oil moves to the oil check pipe side by an amount equivalent to that, and the oil surface on the oil check pipe side is in a raised state. As the temperature of the air chamber falls, the oil surface within the speed reducer chamber rises, and the oil surface on the oil check pipe side returns to its original state.

If oil checking cannot be performed unless a suitable time passes after the end of operation, an operator's workability is worsened.

According to the embodiment, it is possible to provide a shovel and a swiveling speed reducer that can precisely and immediately perform oil checking of lubricating oil after the end of operation of the swiveling drive device.

Hereinafter, embodiments will be described in detail, referring to the accompanying drawings. In addition, in the respective drawings, the same reference numerals will be given to the same constituent portions, and duplicate description will be omitted.

First, the overall configuration of a shovel and the configuration of a drive system into which a swiveling drive device according to an embodiment of the invention is assembled will be described. FIG. 1 is a side view of a construction machine related to the present embodiment. In addition, a shovel is illustrated as an example of the construction machine in FIG. 1. The swiveling drive device according to the embodiment of the invention can be assembled into a construction machine having a mechanism that swivels a swivel body.

An upper swivel body 3 is mounted on a lower traveling body 1 of the shovel illustrated in FIG. 1 via a swiveling mechanism 2. The boom 4 is attached to the upper swivel body 3. An arm 5 is attached to a tip of the boom 4, and a bucket 6 is attached to a tip of the arm 5. The boom 4, the arm 5, and the bucket 6 are hydraulically driven by a boom cylinder 7, an arm cylinder 8, and a bucket cylinder 9, respectively. The upper swivel body 3 is provided with a cabin 10, and is mounted with power sources, such as an engine.

A swiveling drive device for electric swiveling using an electric motor, and a swiveling drive device for hydraulic swiveling using a hydraulic motor can be used for the shovel related to the present embodiment. Hereinafter, a case where the swiveling drive device of electric swiveling is mounted on the shovel will be described.

In addition, the shovel illustrated in FIG. 1 is a shovel that has a power storage device that stores electric power to be supplied to the swiveling drive device. However, the invention can be applied to arbitrary shovels adopting electric swiveling, and can also be applied to, for example, electrical-drive type shovels to which electric power is supplied from an external power source.

Figure 2:
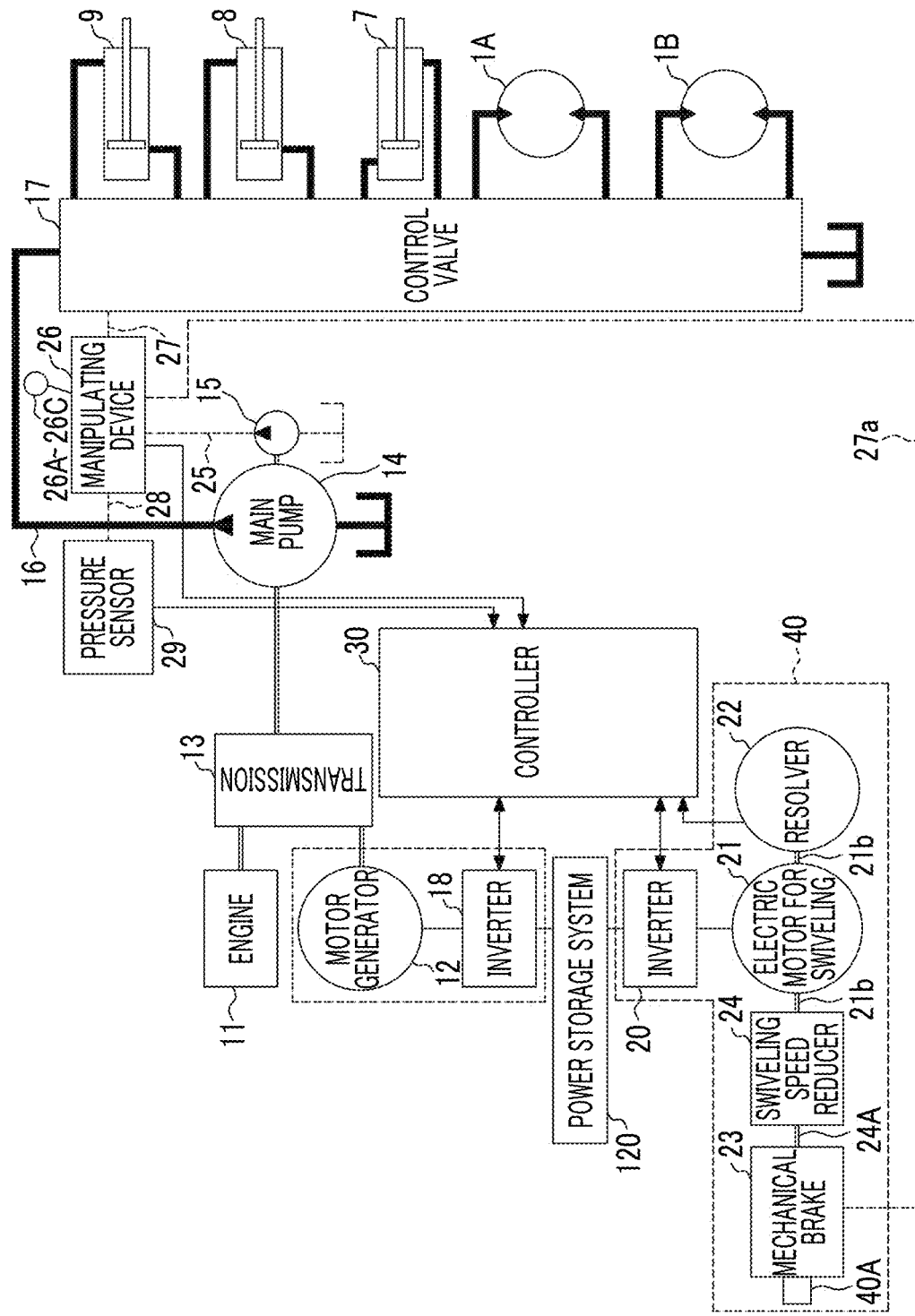
FIG. 2 is a block diagram illustrating the configuration of a drive system of the construction machine illustrated in FIG. 1.

FIG. 2 is a block diagram illustrating the configuration of the drive system of the shovel illustrated in FIG. 1. In FIG. 2, a mechanical power system is illustrated by double lines, high-pressure hydraulic lines are illustrated by thick solid lines, pilot lines are illustrated by dashed lines, and an electrical drive/control system is illustrated by thin solid lines.

An engine 11 serving as a mechanical drive section and a motor generator 12 serving as an assist drive section are respectively connected to two input shafts of a transmission 13. A main pump 14 and a pilot pump 15 are connected to an output shaft of the transmission 13 serving as a hydraulic pump. A control valve 17 is connected to the main pump 14 via a high-pressure hydraulic line 16. Additionally, a manipulating device 26 is connected to the pilot pump 15 via the pilot line 25.

The control valve 17 is a control device that controls a hydraulic system in a hybrid shovel. Hydraulic motors 1A (for the right) and 1B (for the left) for the lower traveling body 1, the boom cylinder 7, the arm cylinder 8, and the bucket cylinder 9 are connected to a control valve 17 via the high-pressure hydraulic lines.

A power storage system (power storage device) 120 including a capacitor serving as a power storage is connected to the motor generator 12 via an inverter 18. An electric motor 21 for swiveling as an electrical working element is connected to the power storage system 120 via an inverter 20. A resolver 22 and a swiveling speed reducer 24 are connected to an output shaft 21b (motor shaft) of the electric motor 21 for swiveling. A mechanical brake 23 is connected to an output shaft 24A of the swiveling speed reducer 24. A swiveling drive device 40 is constituted of the electric motor 21 for swiveling, a resolver 22, the mechanical brake 23, and the swiveling speed reducer 24 serving as a load drive system. Here, the electric motor 21 for swiveling is equivalent to a motor for swiveling the upper swivel body 3 in a swiveling manner, and the mechanical brake 23 is equivalent to a brake device that mechanically applies braking to the upper swivel body 3.

The manipulating device 26 includes a lever 26A, a lever 26B, and a pedal 26C. The lever 26A, the lever 26B, and the pedal 26C are respectively connected to the control valve 17 and a pressure sensor 29 via hydraulic lines 27 and 28. The pressure sensor 29 is connected to the controller 30 that performs drive control of an electrical system.

The controller 30 is a control device serving as a main control unit that controls driving of the hybrid shovel. The controller 30 is constituted of an arithmetic processing unit including a central processing unit (CPU) and an internal memory, and a device that is realized as the CPU executes a program for drive control stored in the internal memory.

The controller 30 converts a signal supplied from the pressure sensor 29 into a speed command, and controls driving of the electric motor 21 for swiveling. A signal supplied from the pressure sensor 29 is equivalent to a signal showing a manipulated variable when the manipulating device 26 is manipulated in order to swivel the swiveling mechanism 2.

The controller 30 controls the operation (switching between an electric (assist) operation and a power-generating operation) of the motor generator 12 and controls driving of a step-up/down converter of the power storage system 120, thereby controlling charge and discharge of the capacitor. The controller 30 controls the switching of a step-up operation and a step-down operation of the step-up/down converter of the power storage system 120, on the basis of a charge state of the capacitor, the operational state (electric (assist) operation or power-generating operation) of the motor generator 12, and the operational state (power operation or regenerative operation) of the electric motor 21 for swiveling, and thereby, controls charge and discharge of the capacitor. Additionally, the controller 30 also controls an amount (charged current or charged electric power) by which the capacitor is charged as will be described below.

In work using the shovel having the configuration as described above, the electric motor 21 for swiveling is driven by electric power supplied via the inverter 20 in order to drive the upper swivel body 3 in a swiveling manner. The rotary power of the output shaft 21b of the electric motor 21 for swiveling is transmitted to an output shaft 40A of the swiveling drive device 40 via the swiveling speed reducer 24 and the mechanical brake 23.

Figure 3:
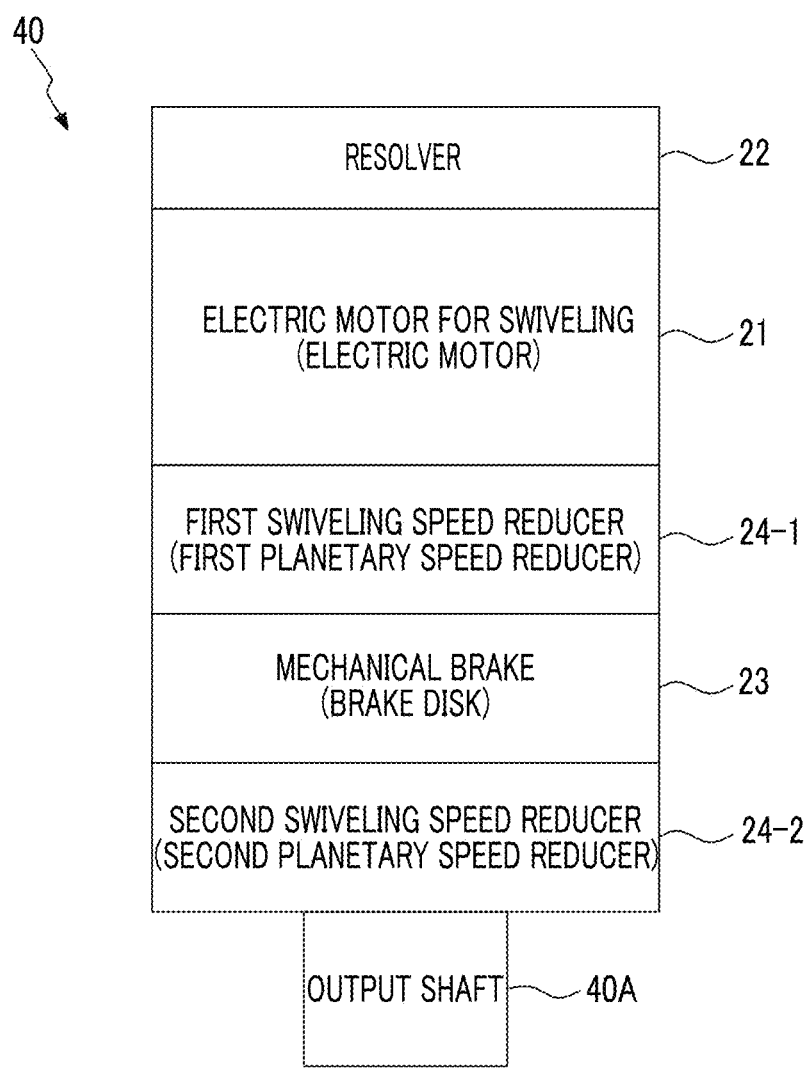
FIG. 3 is a block diagram illustrating the configuration of a swiveling drive device built into the construction machine illustrated in FIG. 1.

FIG. 3 is a block diagram illustrating the configuration of the swiveling drive device 40 assembled into the shovel illustrated in FIG. 1. As described above, the swiveling drive device 40 includes the electric motor 21 for swiveling that is a motor serving as a driving source. The swiveling speed reducer 24 is connected to an output shaft side of the electric motor 21 for swiveling.

Specifically, the swiveling speed reducer 24 has a two-stage configuration of a first swiveling speed reducer 24-1 and a second swiveling speed reducer 24-2. The first swiveling speed reducer 24-1 and the second swiveling speed reducer 24-2 are constituted of planetary speed reducers, respectively. More specifically, the first swiveling speed reducer 24-1 of the first stage is assembled to the electric motor 21 for swiveling. Additionally, a planetary carrier 46 serving as an output shaft of the first swiveling speed reducer 24-1 is provided with a brake disk serving as the mechanical brake 23. Additionally, the second swiveling speed reducer 24-2 of the second stage is assembled to the first swiveling speed reducer 24-1 with the mechanical brake 23 therebetween. Also, an output shaft of the second swiveling speed reducer 24-2 serves as the output shaft 40A of the swiveling drive device 40. In addition, although illustration is omitted, the output shaft 40A of the swiveling drive device 40 is connected to the swiveling mechanism 2, and the swiveling mechanism 2 is driven by the rotary power of the output shaft 40A.

Next, a specific configuration of the swiveling drive device 40 will be described, referring to FIG. 4. In addition, FIG. 4 is an internal structure view of the swiveling drive device illustrated in FIG. 3.

Figure 4:
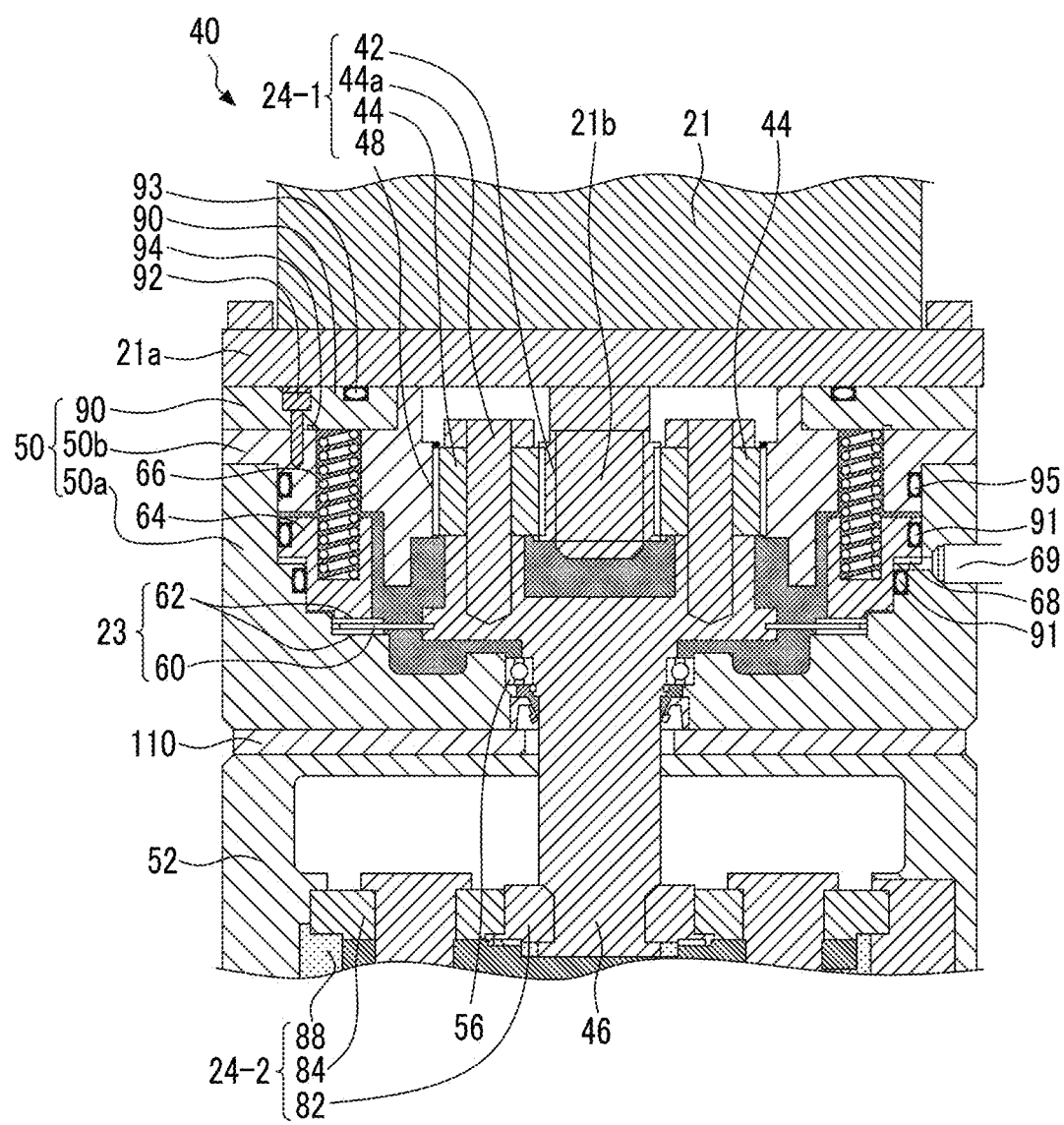
FIG. 4 is an internal structure view of the swiveling drive device illustrated in FIG. 3.

Additionally, FIG. 4 is a cross-sectional view of the portion of the swiveling drive device 40 that constitutes the first swiveling speed reducer 24-1 and the mechanical brake 23. In the present embodiment, a sun gear 42 of the planetary speed reducer that constitutes the first swiveling speed reducer 24-1 is fixed to the output shaft 21b of the electric motor 21 for swiveling. The sun gear 42 is engaged with each of three planetary gears 44. Each of the planetary gears 44 is rotatably supported by the planetary carrier 46 that constitutes the output shaft of the first swiveling speed reducer 24-1 via a pin 44a. Also, each planetary gear 44 is engaged with an internal gear 48 formed on an inner surface of a first gear case 50.

The first gear case 50 formed with the internal gear 48 is fixed to an endplate 21a of the electric motor 21 for swiveling, so that the first gear case itself cannot be rotated. Meanwhile, the planetary carrier 46 that constitutes the output shaft is rotatably supported with respect to the first gear case 50 via a bearing 56. A second gear case 52 is fixed to the first gear case 50 via a conversion adapter 110 to be described below.

Specifically, the above-described first swiveling speed reducer 24-1 has a structure in which the lubricating oil for lubricating the respective gears is sealed. This sealing is performed by the endplate 21a, a body portion 50a, a gear coupling member 50b (second member), and a spring retaining member 90 (first member). The body portion 50a, the gear coupling member 50b (second member), and the spring retaining member 90 (first member) constitute the first gear case 50.

In the first swiveling speed reducer 24-1 having the configuration as above, the planetary gears 44 rotate (rotate on their own axes) if the output shaft 21b of the electric motor 21 for swiveling rotates and the sun gear 42 rotates. The planetary gears 44 are engaged with the internal gear 48 formed on the inner surface of the gear coupling member 50b that constitutes the first gear case 50. Also, the gear coupling member 50b formed with the internal gear 48 tends to rotate with the rotary power of the planetary gears 44. However, since the gear coupling member 50b is fixed to a spring retaining member 90, the gear coupling member cannot rotate. As a result, the planetary carrier 46, which is rotatably supported itself while supporting the planetary gears 44, rotates. The rotational speed of the output shaft 21b of the electric motor 21 for swiveling is reduced by the gear action as above and is output from the planetary carrier 46.

Next, the structure of the brake disk that constitutes the mechanical brake 23 will be described. The brake disk 60 is formed between the body portion 50a that constitutes the first gear case 50 that is a fixing portion, and the planetary carrier 46 that is an output shaft. The brake disk 60 extends outward in a direction of the rotation radius of the planetary carrier 46 from an outer periphery of the planetary carrier 46. Although the brake disk 60 is not rotatable with respect to the planetary carrier 46, the brake disk is movable in an axial direction of the planetary carrier 46. Specifically, the brake disk 60 is connected to the planetary carrier 46, for example via a connection structure, such as a spline connection.

Brake plates 62 are arranged on both upper and lower sides of the brake disk 60. Although the brake plates 62 are not rotatable with respect to the body portion 50a that is a fixing portion, the brake plates are movable in the axial direction of the planetary carrier 46. Specifically, the brake plates 62 are connected to an inner surface side of the second gear case 52, for example via a connection structure, such as a spline connection. A piston 64 is arranged on the upper brake plate 62 in the state of being movable in the axial direction of the planetary carrier 46. The piston 64 is pressed by a spring 66 and is always pressed against the upper brake plate 62. In the present embodiment, a coil spring is used as the spring 66. However, a multistage stacking plate spring that can obtain high output with a small amount of displacement can also be used.

The brake plates 62 and the brake disk 60 are movable in the axial direction of the planetary carrier 46. Therefore, if the upper brake plate 62 is pressed by the piston 64, the brake disk 60 is sandwiched and pressed by the upper and lower brake plates 62. The surfaces of the brake plates 62 and the brake disk 60 are covered with a film with a large frictional coefficient. Also, a brake force to prevent the rotation of the brake disk 60 acts on the brake disk 60 by the brake disk 60 being sandwiched and pressed by the upper and lower brake plates 62. Additionally, the brake disk 60 is connected so as not to be rotatable with respect to the planetary carrier 46. Therefore, the brake force that acts on the brake disk 60 becomes a brake force applied to the planetary carrier 46.

A hydraulic space 68 capable of supplying hydraulic oil is formed between the piston 64 and the body portion 50a, and a brake release port 69 is connected to the hydraulic space 68. Additionally, a seal member 91, such as an O ring, is arranged between the piston 64 and the body portion 50a to perform sealing so that the hydraulic oil within the hydraulic space 68 does not leak. If hydraulic pressure is supplied to the hydraulic space 68 via the manipulating device 26, the hydraulic line 27a (refer to FIG. 2), and the brake release port 69 from the pilot pump 15, the piston 64 is pushed up by the hydraulic pressure, the force of pressing the brake plate 62 is eliminated, and braking is released.

In the first swiveling speed reducer 24-1 having the configuration as above, in the present embodiment, an upper surface of the gear coupling member 50b is formed with a recess, and a bottom surface of this recess is formed with a plurality of through-holes. The above-described spring 66 is inserted into each of the through-holes. A lower end of each spring 66 protrudes from the through-hole of the gear coupling member 50b, and abuts against a bottom surface of a hole formed in the piston 64. Also, a spring retaining member 90 fits to the recess of the gear coupling member 50b. The gear coupling member 50b is fastened and fixed to the spring retaining member 90 by a plurality of bolts 92.

An upper end of each spring 66 protrudes upward from the bottom surface of the recess before the spring retaining member 90 is fixed within the recess of the gear coupling member 50b. Accordingly, when the spring retaining member 90 is fixed within the recess of the gear coupling member 50b, each spring 66 is pressed and compressed by the spring retaining member 90. If the spring retaining member 90 is fixed to the upper surface of the gear coupling member 50b, each spring 66 is brought into a state where the spring is sandwiched and compressed between the spring retaining member 90 and the piston 64. A restoring force (spring force) of each spring 66 in this case is the force of pressing the piston 64 (that is, the brake plates 62) against the brake disk 60, and is a brake force applied to the planetary carrier 46.

The whole spring retaining member 90 is housed within the recess in a state where the spring retaining member 90 is fixed within the recess of the gear coupling member 50b. Therefore, the spring retaining member 90 does not protrude from a mating face of the gear coupling member 50b that abuts against the end plate 21a (also referred to as a flange) of the electric motor 21 for swiveling. Accordingly, only the mating face of the gear coupling member 50b abuts against the endplate 21a of the electric motor 21 for swiveling. However, the seal member 93, such as an O ring, is arranged on the upper surface of the spring retaining member 90, and performs sealing so that lubricating oil for lubricating and cooling the planetary gears 44 within the gear coupling member 50b does not leak. Additionally, the seal member 94, such as an O ring, is also arranged on the lower surface of the spring retaining member 90, and performs sealing so that lubricating oil with which a portion that houses the spring 66 is filled does not leak. Similarly, the seal member 95, such as an O ring, is also arranged between the body portion 50a and the gear coupling member 50b, and performs sealing so that the lubricating oil with which the portion that houses the spring 66 is filled does not leak.

Figure 5:
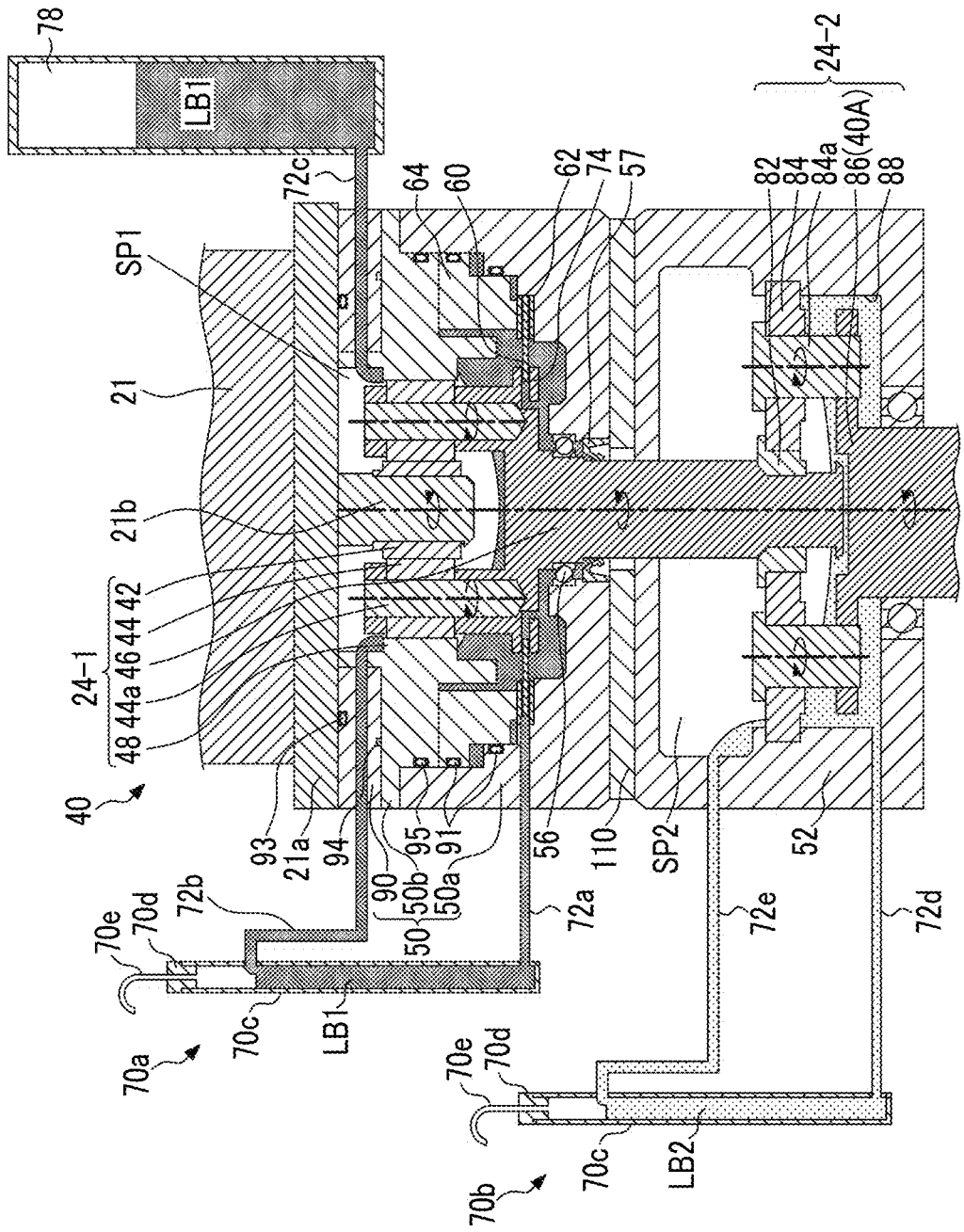
FIG. 5 is an enlarged cross-sectional view of essential portions illustrating the state of the swiveling drive device when an electric motor for swiveling rotates.
Figure 6:
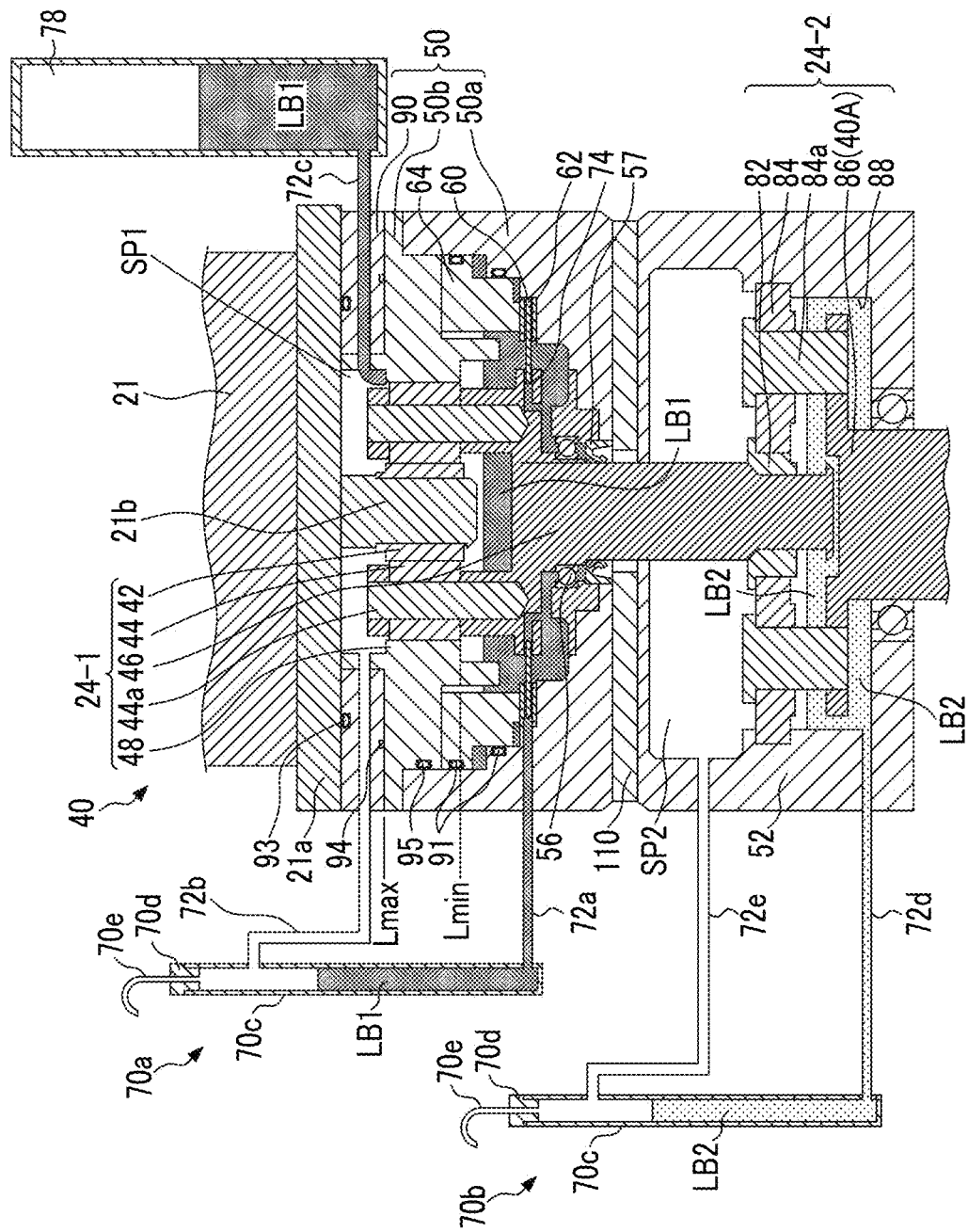
FIG. 6 is an enlarged cross-sectional view of the essential portions illustrating the state of the swiveling drive device immediately after the rotation of the electric motor for swiveling has stopped.
Figure 7:
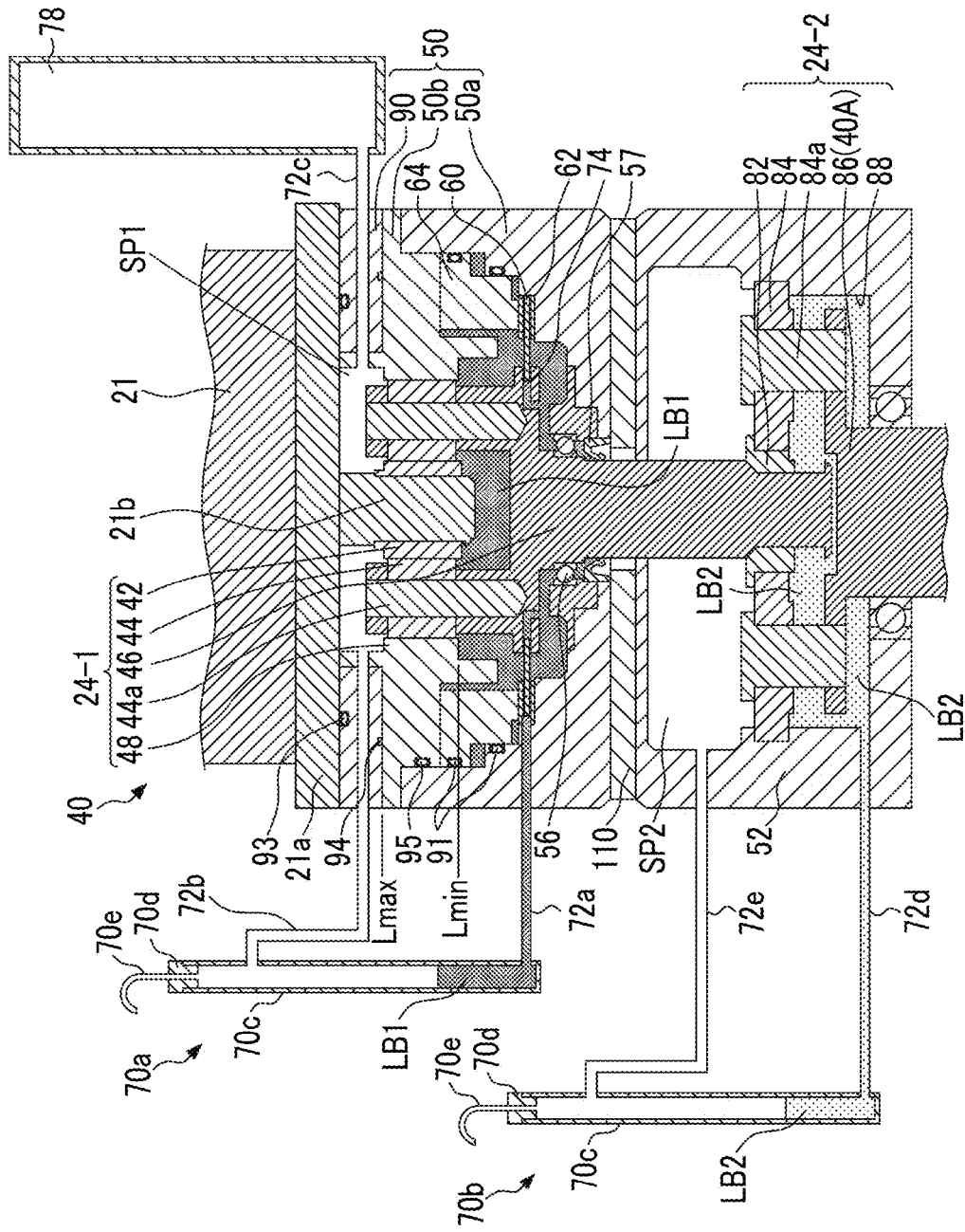
FIG. 7 is an enlarged cross-sectional view of the essential portions illustrating the state of the swiveling drive device when the rotation of the electric motor for swiveling stops.
Figure 8:
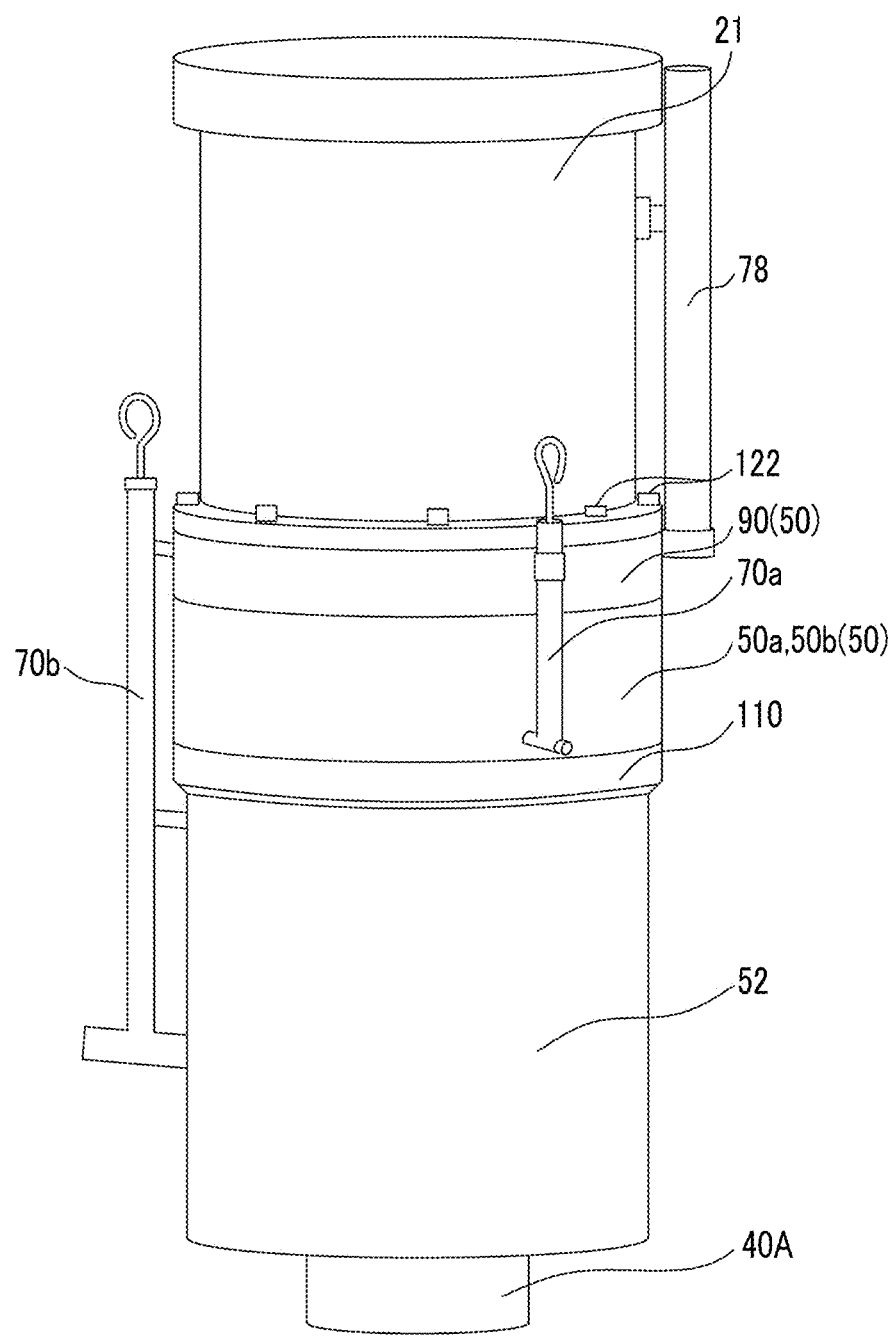
FIG. 8 is a perspective view illustrating the configuration of the swiveling drive device illustrated in FIG. 3.

Next, transmission of the rotational driving power in the swiveling drive device 40 will be described, referring to FIGS. 5 to 7. In addition, FIG. 5 is an enlarged cross-sectional view of essential portions illustrating the state of the swiveling drive device when the electric motor for swiveling rotates. Additionally, FIG. 6 is an enlarged cross-sectional view of the essential portions illustrating the state of the swiveling drive device immediately after the rotation of the electric motor for swiveling has stopped. Additionally, FIG. 7 is an enlarged cross-sectional view of the essential portions illustrating the state of the swiveling drive device when the rotation of the electric motor for swiveling stops.

As illustrated in FIG. 5, the first swiveling speed reducer 24-1 is constituted of a planetary gear mechanism including the sun gear 42, the planetary gears 44, the planetary carrier 46, and the internal gear 48 (first gear mechanism). Additionally, the second swiveling speed reducer 24-2 is constituted of a planetary gear mechanism including a sun gear 82, a planetary gear 84, a planetary carrier 86, and an internal gear 88 (second gear mechanism).

In the first swiveling speed reducer 24-1, the sun gear 42 is fixed to the output shaft 21b of the electric motor 21 for swiveling and is engaged with the planetary gears 44. The planetary gears 44 revolve while rotating on their own axes between the internal gear 48 and the sun gear 42 that are formed at an inner wall of the gear coupling member 50b that constitutes the first gear case 50. In the present embodiment, the first swiveling speed reducer 24-1 has three planetary gears 44. Each of the three planetary gears 44 rotates the planetary carrier 46 by revolving while rotating on its own axis. In addition, the planetary carrier 46 constitutes the output shaft of the first swiveling speed reducer 24-1.

Additionally, in the present embodiment, the sun gear 42 and each of the three planetary gears 44 are constituted of helical gears, and the internal gear 48 is constituted of a helical internal gear (not illustrated). In addition, the helical gears include double-helical gears. This is because the double-helical gears have a configuration in which helical gears of which the twist directions are opposite directions are combined together. The same also applies to the internal helical gear. Additionally, as long the sun gear 42 and each of the three planetary gears 44 are gears with a higher meshing rate than spur gears, gears other than the helical gears may be used. The same also applies to the internal gear 48. By virtue of this configuration, the swiveling drive device 40 can reduce noise or vibration generated by the swiveling speed reducer 24. This is because a plurality of gear teeth always mesh with each other and smooth movement is realized.

In the second gear mechanism that constitutes the second swiveling speed reducer 24-2, the sun gear 82 is fixed to the planetary carrier 46 serving as the output shaft of the first swiveling speed reducer 24-1 and is engaged with the planetary gears 84. The planetary gears 84 revolve while rotating on their own axis between the internal gear 88 and the sun gear 82 that are formed at an inner wall of the second gear case 52. In the present embodiment, the second swiveling speed reducer 24-2 has three planetary gears 84. Each of the three planetary gears 84 is rotatably supported by the planetary carrier 86 via a pin 84a, and rotates the planetary carrier 86 by revolving while rotating on its own axis. In addition, the planetary carrier 86 constitutes the output shaft of the second swiveling speed reducer 24-2.

Additionally, in the present embodiment, the sun gear 82 and each of the three planetary gears 84 are constituted of spur gears, and the internal gear 88 is constituted of an internal spur gear. This is because the gears that constitute the second swiveling speed reducer 24-2 have a lower rotating speed than the gears that constitute the first swiveling speed reducer 24-1 and noise level and vibration level are also low. However, the invention is not limited to this configuration. For example, the sun gear 82 and each of the three planetary gears 84 may be constituted of helical gears with a higher meshing rate than the spur gears. The same also applies to the internal gear 88. By virtue of this configuration, the swiveling drive device 40 can further reduce noise or vibration generated by the swiveling speed reducer 24.

In this way, in the first swiveling speed reducer 24-1 of the present embodiment, the swiveling drive device 40 that is a high-speed stage is constituted of the helical gears, and the second swiveling speed reducer 24-2 that is a low-speed stage is constituted of the spur gears. Therefore, the swiveling drive device 40 can be manufactured with relatively low manufacturing costs while realizing a reduction in noise and vibration. Specifically, the swiveling drive device 40 can realize a reduction in noise and vibration by constituting the first swiveling speed reducer 24-1, which generates a relatively large amount of noise and vibration for a relatively high rotating speed, of the helical gears. Also, the reduction in noise and vibration can reduce an operator's fatigue or displeasure. Additionally, the swiveling drive device 40 can suppress an increase in manufacturing cost compared to a case where the helical gears are adopted, by constituting the second swiveling speed reducer 24-2, which generates only a relatively small amount of noise and vibration for a relatively low rotating speed, of the spur gear. In addition, in order to obtain the same effects, the first swiveling speed reducer 24-1 that is a high-speed stage may be constituted of helical gears, and the second swiveling speed reducer 24-2 that is a low-speed stage may be constituted of spur gears.

By virtue of the above-described configuration, the swiveling drive device 40 reduces the rotating speed of the output shaft 21b of the electric motor 21 for swiveling and increases the torque of the output shaft 40A.

Specifically, as illustrated in FIG. 5, the swiveling drive device 40 revolves the planetary gears 44 clockwise while rotating the planetary gears 44 counterclockwise on their own axes and rotates the planetary carrier 46 clockwise, according to the clockwise high-speed and low-torque rotation of the output shaft 21b. Also, the swiveling drive device 40 revolves the planetary gears 84 clockwise while rotating the planetary gears 84 counterclockwise on their own axes and rotates the planetary carrier 86, that is, the output shaft 40A clockwise at a low speed and with a high torque, according to the clockwise rotation of the planetary carrier 46. This is the same except that the rotational directions of the respective gears are reversed, even when the output shaft 21b rotates counterclockwise.

The swiveling drive device 40 has a space SP1 sealed by the end plate 21a of the electric motor 21 for swiveling, the body portion 50a, the gear coupling member 50b, and the spring retaining member 90. Also, an oil seal (not illustrated) is mounted on the output shaft 21b, and an oil seal 57 is mounted on the planetary carrier 46. The space SP1 houses the sun gear 42, the planetary gears 44, the planetary carrier 46, the brake disk 60, the brake plates 62, and the piston 64, and is supplied with lubricating oil LB1 (first lubricating oil) represented by a fine dot pattern. Additionally, the space SP1 is connected to a first oil check pipe 70a via the first communication portion 72a and the second communication portion 72b. Moreover, the space SP1 is connected to a buffer tank 78 via a third communication portion 72c.

Specifically, the first oil check pipe 70a communicates with a lower region of the space SP1 via a communication path that is formed in the first communication portion 72a and the body portion 50a. Additionally, an upper region of the first oil check pipe 70a communicates with an upper region (hereinafter referred to as a "first upper space") of the space SP1 via a communication path that is formed in the second communication portion 72b and in the inside of the spring retaining member 90. Additionally, the buffer tank 78 communicates with the first upper space via a communication path that is formed in the third communication portion 72c and the inside of the spring retaining member 90.

By arranging the buffer tank 78 at the above position, the first lubricating oil LB1 that has moved to the buffer tank 78 can be immediately returned to the inside of the first upper space when the swiveling drive device 40 is at rest. Accordingly, the above sun gear 42 or the like can receive a supply of lubricating oil, and can more effectively prevent seizure of a gear without causing a shortage of lubricating oil.

Additionally, the swiveling drive device 40 has a space SP2 sealed by the second gear case 52. An oil seal (not illustrated) is mounted on the planetary carrier 86. The space SP2 houses the sun gear 82, the planetary gears 84, and the planetary carrier 86, and is supplied with lubricating oil LB2 (second lubricating oil) represented by a coarse dot pattern. In addition, the second lubricating oil LB2 is isolated from the first lubricating oil LB1 by the oil seal 57. Additionally, the second lubricating oil LB2 may be the same kind of lubricating oil as the first lubricating oil LB1, or may be a different kind of lubricating oil. For example, in the swiveling drive device 40, a kind of lubricating oil that is different from the second lubricating oil LB2 for low-speed rotation may be the first lubricating oil LB1 for high-speed rotation.

Since the temperature of the lubricating oil inside a swiveling speed reducer rises by operating the swiveling drive device 40 having a related-art structure, volume expansion is caused, and the pressure of an air chamber that is an upper region within the speed reducer rises. The temperature rise of this lubricating oil does not fall immediately even it the swiveling drive device 40 is rested. Therefore, there occurs a phenomenon in which the oil surface of the lubricating oil within the swiveling speed reducer is pushed down with this pressure rise, and the lubricating oil moves to an oil check pipe side by an amount equivalent to that.

However, since a speed reducer chamber is completely sealed by the lubricating oil that has moved to the oil check pipe side, the pressure that has risen due to the volume expansion is maintained within the air chamber. As a result, even if the swiveling drive device 40 is rested, the lubricating oil within the oil check pipe cannot be immediately returned to the inside of the speed reducer chamber, and oil checking cannot be performed unless a suitable amount of time passes after the end of operation. Additionally, when the oil check pipe is opened during oil checking of the lubricating oil, there is a possibility that the lubricating oil may be blown down.

In order to perform air bleeding of the air chamber (first upper space) within the speed reducer, an air-bleeding plug is also considered. However, it is very troublesome for an operator to detach the plug and perform air bleeding of this air chamber whenever the swiveling drive device 40 is rested.

Thus, the swiveling drive device 40 related to the present embodiment provides a mechanism, which prevents an excessive pressure rise within the space SP1 and blowing-down of lubricating oil, on the first oil check pipe 70a side. Specifically, the upper region of the first oil check pipe 70a is open to atmospheric pressure, and this upper region, and the upper region (first upper space) of the space SP1 communicate with each other via the second communication portion 72b. Therefore, the air inside the first upper space is discharged to the outside via the upper region of the oil check pipe 70a. Accordingly, the pressure inside the first upper space drops easily, and the first lubricating oil LB1 inside the first oil check pipe 70a and the buffer tank 78 easily returns to the inside of the space SP1.

The first lubricating oil LB1 inside the first oil check pipe 70a and the buffer tank 78 is going to return simultaneously from all paths when the pressure of the first upper space drops. That is, the first lubricating oil returns simultaneously from a plurality of paths. That is, as there are more paths along which the lubricating oil discharged to the outside returns to the inside, the first lubricating oil LB1 returns rapidly and oil checking can be immediately performed. In the present embodiment, the lubricating oil returns from the first oil check pipe 70a and the buffer tank 78. However, the number of return paths may be further increased to three or more.

Since the configuration of the second swiveling speed reducer 24-2 is basically the same as that of the first swiveling speed reducer 24-1, the description thereof will be omitted.

In addition, both of the first communication portion 72a and the third communication portion 72c may be in a non-regulated state where the flow of lubricating oil is not regulated by a throttle or the like.

Additionally, an oil passage 74 is provided in the planetary carrier 46 so that the first lubricating oil LB1 can be supplied from a radial inner side of the brake disk 60. By virtue of the oil passage 74, the swiveling drive device 40 can form the flow of the first lubricating oil LB1 along the surface of the brake disk 60, and can efficiently cool the brake disk 60.

In addition, in the present embodiment, one brake disk 60 is arranged between the two brake plates 62. However, a configuration using a plurality of brake disks 60 may be adopted. Specifically, a configuration in which three brake disks 60 are arranged may be respectively adopted between the four brake plates 62. In this case, the oil passage 74 may extend up to the vicinity of the rotating shaft of the planetary carrier 46, and may be connected to a portion of the space SP1 under the sun gear 42 through one or a plurality of openings.

Also, if the electric motor 21 for swiveling rotates, as illustrated in FIG. 5, the first lubricating oil LB1 within the space SP1 forms a mortar-like oil surface according to the centrifugal force of the gears for the first swiveling speed reducer 24-1. The first lubricating oil LB1 within the space SP1 is fed into the second communication portion 72b and the third communication portion 72c, which are connected to the upper region (first upper space) of the space SP1, by the above centrifugal pump action caused by the rotating planetary carrier 46 and brake disk 60. Specifically, as an upper surface of the oil surface of the first lubricating oil LB1 formed in the shape of a mortar reaches the second communication portion 72b and the third communication portion 72c, the first lubricating oil LB1 moves to the first oil check pipe 70a and the buffer tank 78, respectively.

If the rotation of the electric motor 21 for swiveling stops, as illustrated in FIG. 6, the first lubricating oil LB1 within the space SP1 in which the mortar-like oil surface is formed forms a horizontal oil surface within the space SP1. Then, the centrifugal pump action caused by the rotation of the planetary carrier 46 and the brake disk 60 disappears. Therefore, the first lubricating oil LB1 within the second communication portion 72b is discharged to the first upper space.

Then, the first lubricating oil LB1 within the buffer tank 78 is discharged to the first upper space through the third communication portion 72c, and the first lubricating oil LB1 within the first oil check pipe 70a is discharged to the space SP1 through the first communication portion 72a until the oil surface is stabilized.

As a result, the operator can immediately and precisely perform oil checking of the first lubricating oil LB1 within the first swiveling speed reducer 24-1 after the end of operation of the swiveling drive device 40.

In addition, in the present embodiment, the pressure of the upper region of the buffer tank 78 is kept from excessively rising by providing a breather (not illustrated) in an upper portion of the buffer tank 78.

Even in the second swiveling speed reducer 24-2, a second oil check pipe 70b is provided similar to the first swiveling speed reducer 24-1. Specifically, a fourth communication portion 72d that allows the second oil check pipe 70b and a lower region of the space SP2 to communicate with each other is disposed in the second swiveling speed reducer 24-2. Additionally, a fifth communication portion 72e that allows the upper region of the second oil check pipe 70b and an upper region (hereinafter referred to as a "second upper space") of the space SP2 to communicate with each other is disposed in the second swiveling speed reducer 24-2. Also, since the structure of the second oil check pipe 70b is basically the same as the structure of the first oil check pipe 70a, it is possible to smoothly return the second lubricating oil LB2 discharged to the second oil check pipe 70b to the space SP2, similar to the case of the first swiveling speed reducer 24-1. Accordingly, oil checking of the second lubricating oil LB2 can be precisely and immediately performed.

Since the structure of the second swiveling speed reducer 24-2 is basically the same as that of the first swiveling speed reducer 24-1, the detailed description thereof will be omitted.

Meanwhile, the buffer tank 78 is not connected to the second swiveling speed reducer 24-2, unlike the first swiveling speed reducer 24-1. This is because a space, which enables the upper region (second upper space) of the space SP2 to be largely secured, is present in the second swiveling speed reducer 24-2. Therefore, it is possible to absorb an amount equivalent to the volume expansion of the second lubricating oil LB2 with this second upper space, and it is not necessary to provide the buffer tank (refer to FIGS. 4 to 7). In addition, the second upper space may be made smaller and the buffer tank may be disposed outside the second swiveling speed reducer 24-2.

Next, the position of an initial oil surface when the swiveling drive device 40 is rested will be described. In the following, the position of the initial oil surface of the first lubricating oil LB1 supplied to the inside of the first swiveling speed reducer 24-1 will be described. Since the position of the initial oil surface of the second lubricating oil LB2 supplied to the inside of the second swiveling speed reducer 24-2 is basically the same as that of the first swiveling speed reducer 24-1, the description thereof will be omitted.

The position of the oil surface submerged in a bottom surface of a certain gear among the sun gear 42, the planetary gears 44, and the internal gear 48 that constitute the first gear mechanism, is defined as Lmin, and the position of an oil surface submerged in an upper surface of the gear is defined as Lmax. It is preferable that the initial oil surface L1 of the first lubricating oil LB1 is set so as to be located between Lmax and Lmin.

Accordingly, even in a case where the rotation of the electric motor 21 for swiveling has stopped, portions of the sun gear 42, the planetary gears 44, the internal gear 48, and the like are submerged in the first lubricating oil LB1. As a result, seizure of a gear can be more effectively prevented.

In addition, a case where the second communication portion 72b is connected to the first swiveling speed reducer 24-1 at a position above an upper surface of a certain gear among the sun gear 42 and the like that constitute the first gear mechanism is illustrated in FIGS. 5 to 7. However, the invention is not limited to this configuration. The position of the first gear case 50 higher than a position where the first communication portion 72a is connected, and a high position of the first oil check pipe 70a may be connected together. The high position of the first oil check pipe 70a can be over the oil surface in the oil check pipe 70a when the rotation of the electric motor for swiveling has stopped.

A case where the second communication portion 72b is connected to the first swiveling speed reducer 24-1 at a position above the initial oil surface L1 is illustrated in FIGS. 5 to 7. The fifth communication portion 72e that allows the second oil check pipe 70b and the upper region (second upper space) of the space SP2 to communicate with each other is connected to the same position as described above.

This is because useless lubricating oil (second lubricating oil) flows into the buffer tank 78 if the fifth communication portion 72e is provided at a position below the initial oil surface. During the volume expansion of lubricating oil, the buffer tank 78 has a function of absorbing the lubricating oil by an amount equivalent to this expansion. Therefore, it is more preferable that the lubricating oil during the resting (normal time) of the electric motor 21 for swiveling when the volume expansion of the lubricating oil is not caused is not made to flow in.

Moreover, in the present embodiment, the upper region of the first oil check pipe 70a is configured so as to be open to atmospheric pressure. Specifically, a tubular body 70c of which an upper portion is open is covered by a top plate 70d, and a communication pipe 70e is inserted into the top plate 70d. Therefore, the first lubricating oil LB1 inside the first oil check pipe 70a and the buffer tank 78 easily returns to the inside of the space SP1. As a result, the above sun gear 42 or the like can immediately receive a supply of lubricating oil, and can more effectively prevent seizure of a gear without causing a shortage of lubricating oil.

In addition, in the present embodiment, the first oil check pipe 70a is disposed outside the first swiveling speed reducer 24-1. Therefore, the first lubricating oil LB1 can be efficiently cooled, and the pressure within the upper region of the first oil check pipe 70a can be efficiently dropped.

Moreover, in the present embodiment, the first oil check pipe 70a and the buffer tank 78 are configured so that their positions can be shifted from each other.

Specifically, the buffer tank 78 is disposed at the spring retaining member 90 that constitutes the first gear case 50, and the first oil check pipe 70a is disposed at the body portion 50a that constitutes the first gear case 50. The spring retaining member 90 and the body portion 50a are detachably joined together at two or more joining positions (not illustrated). The joining positions of the spring retaining member 90 are arranged on the same circumference centered on the output shaft 21b (motor shaft) of the electric motor 21 for swiveling. The joining positions of the body portion 50a are formed at positions corresponding to the joining positions of the spring retaining member 90, and are fastened at fastening portions 122, such as bolts, by matching the joining positions of the spring retaining member 90 with the joining positions of the body portion 50a.

The above joining positions are arranged so that the lengths of arcs between the joining positions adjacent to each other become equal to each other.

Therefore, if the electric motor 21 for swiveling rotates with the output shaft 21b thereof as a center so that the joining positions of the body portion 50a and the joining positions of the spring retaining member 90 are matched with each other, the positions of the buffer tank 78 and the first oil check pipe 70a can be shifted from each other. In addition, the second communication portion 72b can be attached to and detached from the spring retaining member 90, and when the position of the buffer tank 78 and the position of the first oil check pipe 70a are shifted from each other, the second communication portion 72b can be detached from the spring retaining member 90 in advance. Then, after the shifting, for example, a long second communication portion 72b is prepared, and the communication path formed in the spring retaining member 90, and the second communication portion 72b are connected together.

The first oil check pipe 70a and the second oil check pipe 70b are also configured so that their positions can also be shifted from each other. The body portion 50a and the second gear case 52 are detachably joined together at two or more joining positions. The second gear case 52 is joined to the body portion 50a via a conversion adapter 110 (refer to FIGS. 5 to 8). The joining positions of the second gear case 52 and the conversion adapter 110 are formed at positions corresponding to the joining positions of the body portion 50a. By matching the joining positions of the body portion 50a and the joining positions of the second gear case 52 with each other, the body portion and the second gear case are fastened at the fastening portions 122, such as bolts.

The above joining positions are arranged so that the lengths of arcs between the joining positions adjacent to each other become equal to each other. Similar to the above, if the electric motor 21 for swiveling rotates with the output shaft 21b thereof as a center so that the joining positions of the body portion 50a and the joining positions of the second gear case 52 are matched with each other, the positions of the first oil check pipe 70a and the second oil check pipe 70b can be shifted from each other.

Since the swiveling drive device 40 is configured as described above, the respective oil check pipes 70a and 70b and the buffer tank 78 can be respectively and independently shifted to positions such that the oil check pipes and the buffer tank do not interfere with each other. Accordingly, the positions of the oil check pipes and the buffer tank can be appropriately shifted from each other according to the arrangement relationship of other parts, piping situations, or the like when the swiveling drive device 40 is mounted on different types of shovels, and it is possible to adopt the swiveling drive device 40 common to the different types of shovels. Since it is not necessary to perform redesign, this leads to a reduction in the number of man-hours for design.

Additionally, as described above, as the upper surface of the oil surface of the first lubricating oil LB1 formed in the shape of a mortar reaches the second communication portion 72b during the rotation of the electric motor 21 for swiveling, the first lubricating oil LB1 moves to the first oil check pipe 70a. Then, the first oil check pipe 70a performs adjustment of the oil surface so that the position of the oil surface is maintained at a connecting position of the second communication portion 72b. That is, although the first lubricating oil LB1 is moved to the first oil check pipe 70a by a centrifugal pump action, in order perform adjustment of the oil surface, the first lubricating oil LB1 that has flowed in from the second communication portion 72b flows out of the first communication portion 72a and is returned to the inside of the space SP1. This phenomenon occurs because the pressure of the upper region (first upper space) of the space SP1 becomes higher than the pressure of the lower region of space SP1.

As described, since the first lubricating oil LB1 also has a circulation action, a phenomenon in which seizure of a gear caused by shortage of lubricating oil occurs can be more effectively prevented.

Although the preferred embodiment of the invention has been described in detail above, the invention is not limited to the above-described embodiment, and various modifications and substitutions can be added without departing from the scope of the invention.

In the above-described embodiment, in the swiveling drive device 40, the communication portions are respectively inside the first gear case 50 and the second gear case 52. However, the invention is not limited to this configuration. For example, communication grooves, which are respectively formed in inner surfaces of the first and second bodies 50 and 52, may be included.

Additionally, although a case where the upper region of the first oil check pipe 70a is open to atmospheric pressure by covering the tubular body 70c, of which the upper portion is open, with the top plate 70d and by inserting the communication pipe 70e into the top plate 70d has been illustrated and described in the above-described embodiment, the invention is not limited to this configuration. For example, the first oil check pipe 70a may be constituted of the tubular body 70c of which the upper portion is open, and the upper region of the first oil check pipe 70a may be open to atmospheric pressure.

Additionally, although a case where the swiveling drive device 40 has a two-stage configuration of the first swiveling speed reducer 24-1 and the second swiveling speed reducer 24-2 has been illustrated and described, the invention is not limited to this configuration. For example, the swiveling drive device may be constituted of three stages of a high-speed stage, a medium-speed stage, and a low-speed stage, or may have a configuration of three or more stages.

Additionally, although the planetary speed reducers have been illustrated and described in the swiveling speed reducer related to the present embodiment of the invention, the invention is not limited to this configuration. For example, the swiveling speed reducer may be constituted of a cycloidal speed reducer.

Additionally, in the swiveling drive device 40 related to the present embodiment, an electrically driven electric swiveling type swiveling drive device, which is driven by the electric motor 21 for swiveling, has been illustrated and described as an example of a swiveling motor. However, the invention is not limited to this configuration. For example, a hydraulically driven type swiveling drive device driven by a hydraulic motor may be adopted.

It should be understood that the invention is not limited to the above-described embodiment, but may be modified into various forms on the basis of the spirit of the invention. Additionally, the modifications are included in the scope of the invention.

What is claimed is:

1. A shovel comprising a swiveling motor, and a swiveling speed reducer that reduces the rotational speed of an output shaft of the swiveling motor, wherein the swiveling speed reducer includes:
 a first gear mechanism;
 a first gear case configured to house the first gear mechanism;

a first oil check pipe on the first gear case;
a first communication portion configured to communicatively connect the first oil check pipe and lower space inside of the first gear case, the first communication portion connected to a first location of the first gear case lower than the first gear mechanism; and
a second communication portion configured to communicatively connect the first oil check pipe and upper space inside of the first gear case, the second communication port connected to the first gear case at a second location higher than the first location, the upper space located higher than the first gear mechanism, and
wherein the oil check pipe, the first communication portion and the second communication portion constitute a circulation path circulating oil inside the first gear case.

2. The shovel according to claim 1,
wherein the swiveling speed reducer includes:
 a buffer tank on the first gear case; and
 a third communication portion configured to communicatively connect the first gear case and the buffer tank, the third communication portion connected to the first gear case at third location higher than the first gear mechanism.

3. The shovel according to claim 2,
wherein the swiveling speed reducer further includes a second gear mechanism coupled to an output shaft that constitutes the first gear mechanism, and
wherein the swiveling speed reducer includes:
 a second gear case configured to supply lubricating oil for lubrication the second gear mechanism and configured to house the second gear mechanism;
 a second oil check pipe on the second gear case;
 a fourth communication portion configured to communicatively connect the second gear case and the second oil check pipe, the fourth communication portion connected to the second case at a fourth location; and
 a fifth communication portion connected to the second gear case at a fifth location higher than the fourth location, the fourth location higher than the second oil check pipe.

4. The shovel according to claim 3,
wherein, in the swiveling speed reducer, the fifth location is not above an oil surface of the lubricating oil during the rotation of the swiveling motor.

5. The shovel according to claim 3,
wherein, in the swiveling speed reducer, the first oil check pipe and the second oil check pipe are open to atmospheric pressure.

6. The shovel according to claim 2,
wherein interior of the first gear case is sealed by a body portion of the first gear case, a spring retaining member joined to an upper portion of the body portion, and an endplate provided between the first gear case and the swiveling motor,
wherein the third communication portion communicatively connecting the buffer tank to the first gear case is extends through the spring retaining member, the first communication portion and the second communication portion extends through the body portion, and the spring retaining member and the body portion are attachable and detachable, and
wherein the spring retaining member and the body portion are joined together at two or more joining locations, the two or more joining locations are arranged on the same circumference centered on a motor shaft of the swiveling motor, and the lengths of arcs between the joining positions adjacent to each other are equal.

7. The shovel according to claim 6,
wherein the body portion and the second gear case constitute a sub-module that is attachable and detachable via a conversion adapter, and
wherein the body portion and the second gear case are joined together at two or more joining locations, the two or more joining locations arranged on the same circumference centered on a motor shaft of the swiveling motor, and the lengths of arcs between the joining locations adjacent to each other are equal.

8. The shovel according to claim 1,
wherein the first gear mechanism includes a sun gear fixed to an output shaft of the swiveling motor, an internal gear in the first gear case, and planetary gears between the internal gear and the sun gear, the planetary gears configured to engage with the sun gear and revolve around the sun gear,
wherein the lower space is between a lowest portion of the first gear mechanism and a bottom interior surface of the first gear case, and
wherein the upper space is between a highest portion of the first gear mechanism and a top interior surface of the first gear case.

\* \* \* \* \*